US012641562B2

(12) United States Patent
     Bai et al.

(10) Patent No.:     US 12,641,562 B2
(45) Date of Patent:          May 26, 2026

(54) CONFIGURATION OF COMMUNICATION PARAMETERS BASED AT LEAST IN PART ON TIME OR A LOCATION OF USER EQUIPMENT

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 18/194,892

(22) Filed: Apr. 3, 2023

(65) Prior Publication Data

US 2024/0334360 A1     Oct. 3, 2024

(51) Int. Cl.
     *H04W 56/00*          (2009.01)
     *H04W 52/28*          (2009.01)
(52) U.S. Cl.
     CPC ....... *H04W 56/005* (2013.01); *H04W 52/285* (2013.01)
(58) Field of Classification Search
     None
     See application file for complete search history.

(56) References Cited

U.S. PATENT DOCUMENTS

| | | | | |
|---|---|---|---|---|
| 2020/0314788 A1* | 10/2020 | Yu | ...................... | H04W 56/0065 |
| 2021/0315049 A1* | 10/2021 | Wei | ...................... | H04W 76/27 |
| 2021/0360485 A1* | 11/2021 | Tian | ................... | H04W 74/006 |
| 2022/0124645 A1* | 4/2022 | Yang | ................. | H04W 56/0045 |
| 2023/0131305 A1* | 4/2023 | Cozzo | ............... | H04W 72/0473 |
| | | | | 370/329 |
| 2023/0397196 A1* | 12/2023 | Nishio | .................. | H04L 5/0094 |
| 2024/0155637 A1* | 5/2024 | Wang | .................. | H04W 72/232 |
| 2025/0015957 A1* | 1/2025 | Cao | .................... | H04W 56/0045 |
| 2025/0039817 A1* | 1/2025 | Cirik | .................... | H04L 5/0051 |
| 2025/0113318 A1* | 4/2025 | Yuan | ...................... | H04W 72/02 |

* cited by examiner

*Primary Examiner* — Saumit Shah
(74) *Attorney, Agent, or Firm* — Harrity & Harrity, LLP

(57)          ABSTRACT

Various aspects of the present disclosure generally relate to wireless communication. In some aspects, a user equipment (UE) may receive configuration information configuring at least one of a timing advance parameter or a power control parameter as a function of at least one of time or a location of the UE. The UE may adjust the at least one of the timing advance parameter or the power control parameter based at least in part on the at least one of time or the location of the UE, resulting in one or more adjusted communication parameters. The UE may communicate based at least in part on the one or more adjusted communication parameters. Numerous other aspects are described.

30 Claims, 10 Drawing Sheets

700

710 ⟶ Receive configuration information configuring at least one of a timing advance parameter or a power control parameter as a function of at least one of time or a location of the UE 720 ⟶ Adjust the at least one of the timing advance parameter or the power control parameter based at least in part on the at least one of time or the location of the UE, resulting in one or more adjusted communication parameters 730 ⟶ Communicate based at least in part on the one or more adjusted communication parameters

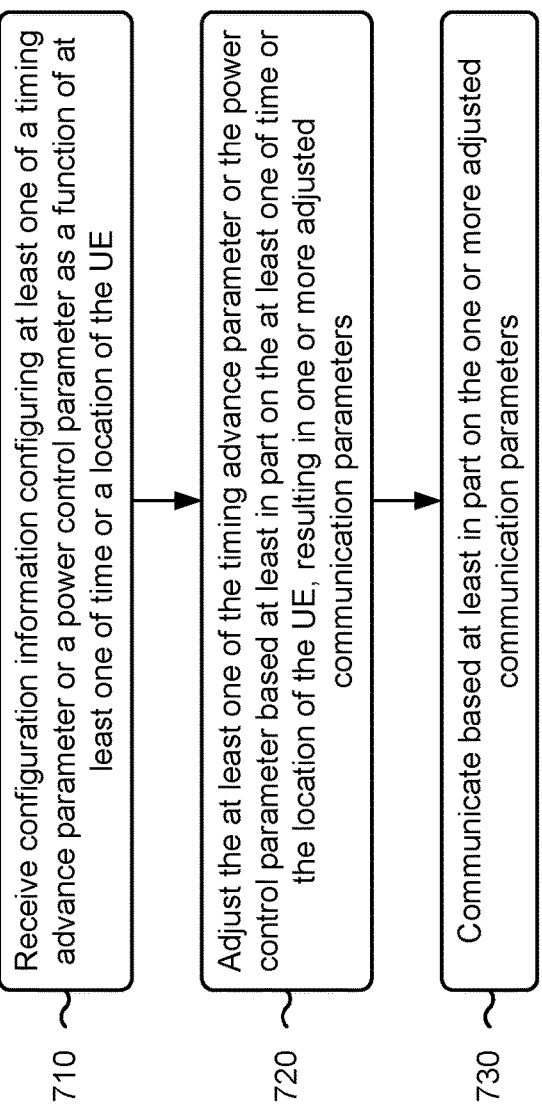

710 — Receive configuration information configuring at least one of a timing advance parameter or a power control parameter as a function of at least one of time or a location of the UE 720 — Adjust the at least one of the timing advance parameter or the power control parameter based at least in part on the at least one of time or the location of the UE, resulting in one or more adjusted communication parameters 730 — Communicate based at least in part on the one or more adjusted communication parameters

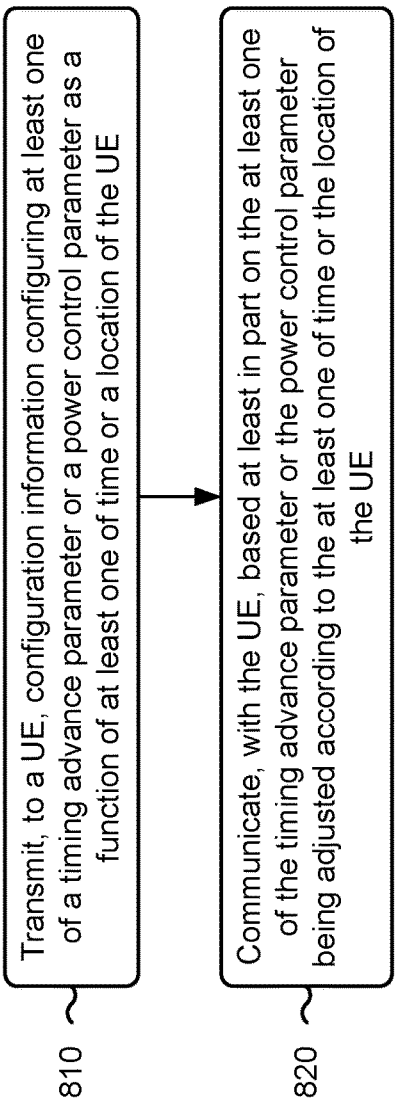

810 Transmit, to a UE, configuration information configuring at least one of a timing advance parameter or a power control parameter as a function of at least one of time or a location of the UE 820 Communicate, with the UE, based at least in part on the at least one of the timing advance parameter or the power control parameter being adjusted according to the at least one of time or the location of the UE

Figure 9:
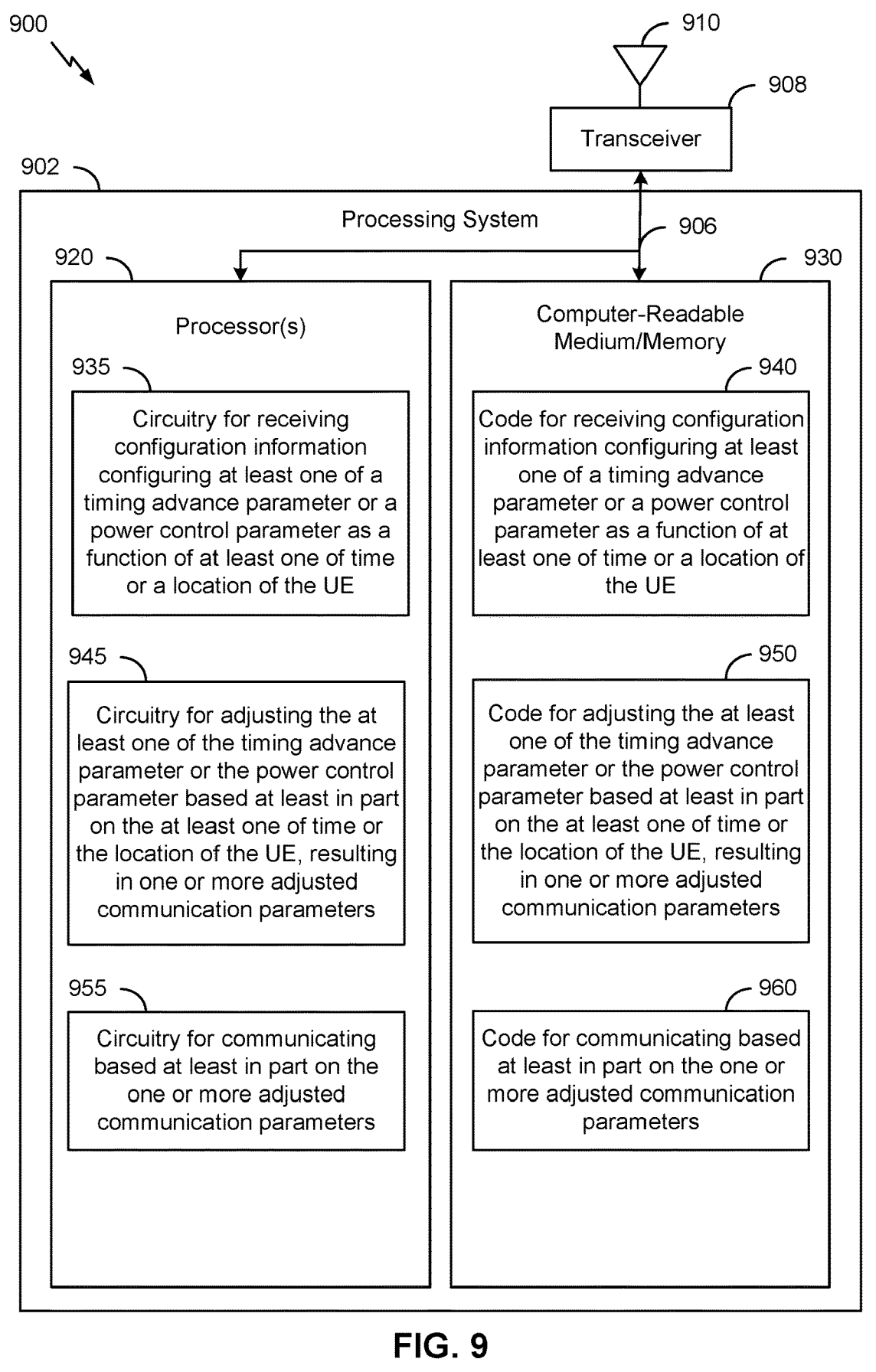

Transceiver

902

Processing System

906

920

930

Processor(s)

Computer-Readable Medium/Memory

935

940

Circuitry for receiving configuration information configuring at least one of a timing advance parameter or a power control parameter as a function of at least one of time or a location of the UE Code for receiving configuration information configuring at least one of a timing advance parameter or a power control parameter as a function of at least one of time or a location of the UE

945

950

Circuitry for adjusting the at least one of the timing advance parameter or the power control parameter based at least in part on the at least one of time or the location of the UE, resulting in one or more adjusted communication parameters Code for adjusting the at least one of the timing advance parameter or the power control parameter based at least in part on the at least one of time or the location of the UE, resulting in one or more adjusted communication parameters

955

960

Circuitry for communicating based at least in part on the one or more adjusted communication parameters Code for communicating based at least in part on the one or more adjusted communication parameters

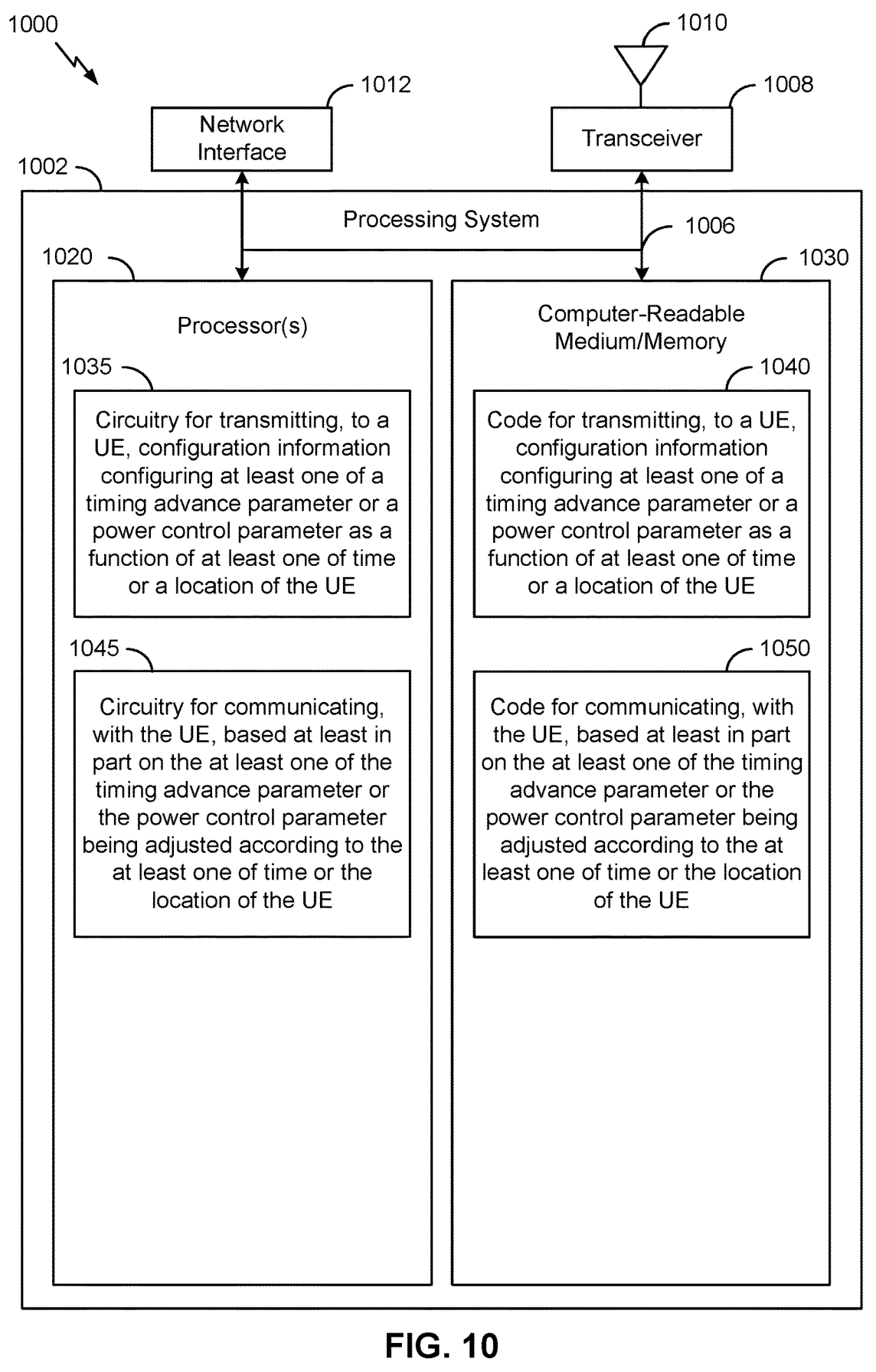

Network Interface

1008

Transceiver

1002

Processing System 1006

1020

1030

Processor(s)

Computer-Readable Medium/Memory

1035

Circuitry for transmitting, to a UE, configuration information configuring at least one of a timing advance parameter or a power control parameter as a function of at least one of time or a location of the UE

1040

Code for transmitting, to a UE, configuration information configuring at least one of a timing advance parameter or a power control parameter as a function of at least one of time or a location of the UE

1045

Circuitry for communicating, with the UE, based at least in part on the at least one of the timing advance parameter or the power control parameter being adjusted according to the at least one of time or the location of the UE

1050

Code for communicating, with the UE, based at least in part on the at least one of the timing advance parameter or the power control parameter being adjusted according to the at least one of time or the location of the UE

FIG. 10

CONFIGURATION OF COMMUNICATION PARAMETERS BASED AT LEAST IN PART ON TIME OR A LOCATION OF USER EQUIPMENT

FIELD OF THE DISCLOSURE

Aspects of the present disclosure generally relate to wireless communication and to techniques and apparatuses for pre-configuring communication parameters associated with a user equipment (UE) that moves in a highly deterministic trajectory, such that the network and/or the UE may autonomously update a configuration as a function of time and/or location of the UE, thereby reducing signaling otherwise associated with updating a timing advance associated with the UE, a transmit power level associated with the UE, and/or similar communication parameters associated with the UE.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving configuration information configuring at least one of a timing advance parameter or a power control parameter as a function of at least one of time or a location of the UE. The method may include adjusting the at least one of the timing advance parameter or the power control parameter based at least in part on the at least one of time or the location of the UE, resulting in one or more adjusted communication parameters. The method may include communicating based at least in part on the one or more adjusted communication parameters.

Another aspect provides a method for wireless communication by a network node. The method includes transmitting, to a UE, configuration information configuring at least one of a timing advance parameter or a power control parameter as a function of at least one of time or a location of the UE. The method may include communicating, with the UE, based at least in part on the at least one of the timing advance parameter or the power control parameter being adjusted according to the at least one of time or the location of the UE.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 shows a method for wireless communications by a UE, in accordance with the present disclosure.

FIG. 8 shows a method for wireless communications by a network node, in accordance with the present disclosure.

FIG. 9 is a diagram illustrating an example of an implementation of code and circuitry for a communications device, in accordance with the present disclosure.

FIG. 10 is a diagram illustrating an example of an implementation of code and circuitry for a communications device, in accordance with the present disclosure.

DETAILED DESCRIPTION

Figure 1:
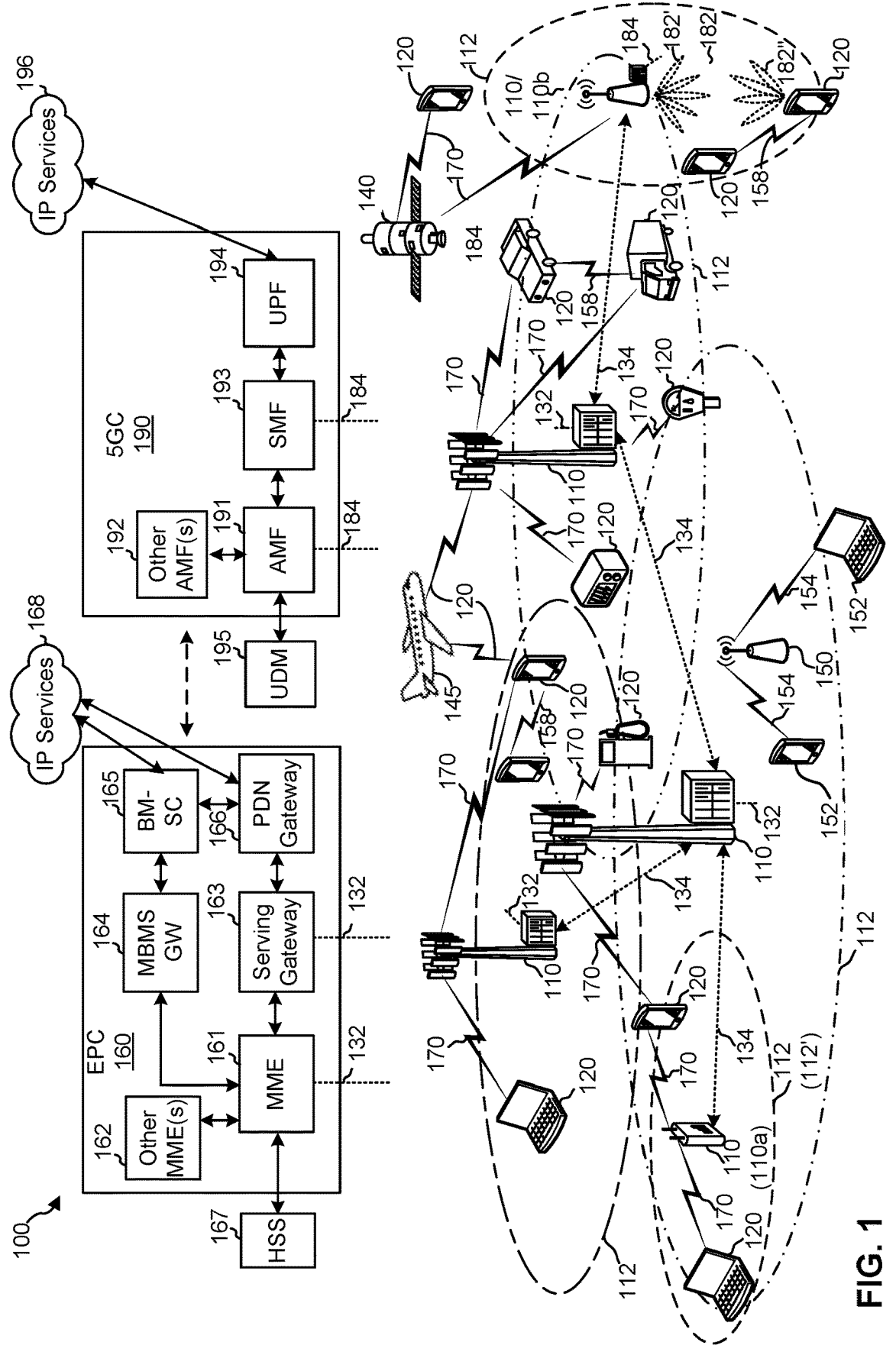
FIG. 1 depicts an example of a wireless communications network, in accordance with the present disclosure.

Aspects of the present disclosure provide apparatuses, methods, processing systems, and computer-readable mediums for pre-configuring communication parameters associated with a user equipment (UE) that moves in a highly deterministic trajectory, such that the network and/or the UE may autonomously update a configuration as a function of time and/or location of the UE, thereby reducing signaling otherwise associated with updating a timing advance associated with the UE, a transmit power level associated with the UE, and/or similar communication parameters associated with the UE.

A wireless link between a network node and UE may change over time, such as when a UE moves farther from or closer to the network node. Accordingly, certain communication parameters may need to be reconfigured and/or updated based at least in part on the UE's movement. For example, a round trip time (RTT) between the network node and the UE may change with the UE's movement. Accordingly, the network node may periodically transmit timing advance commands (TACs) to the UE, signaling to the UE that a timing advance (TA) used by the UE is to be updated. Moreover, a path loss (PL) between the network node and the UE may change with the UE's movement. Accordingly, the network node may periodically transmit one or more PL reference signals to the UE, and the UE may estimate a PL based at least in part on the one or more reference signals and update an uplink transmit power based at least in part on the estimated path loss. In this regard, periodically updating communication parameters may require high signaling overhead and/or may be resource intensive.

In some aspects, such as when a UE is moving in a highly deterministic trajectory (e.g., a UE on a high-speed train moving between stations, a UE associated with robotics in a factory and/or warehouse moving in a known pattern, or a similar UE moving with a known trajectory), a network node may pre-configure a UE with one or more communication parameters as a function of time and/or a location of the UE. In this way, the network node and/or the UE may autonomously adjust a communication configuration based at least in part on time and/or the location of the UE without requiring additional signaling between the network node and the UE. Autonomous adjustment of communication parameters may result in reduced signaling overhead and reduced power, computing, and network resource consumption otherwise associated with updating communication parameters, such as resources associated with updating a TA parameter and/or a power control (PC) parameter.

In some aspects, after configuring the UE with one or more pre-configured communication parameters as a function of time and/or the location of the UE, the network node may monitor a wireless link to determine if a surrounding radio frequency (RF) environment has changed and/or to determine if the pre-configured communication parameters are no longer performing as expected. In such aspects, if the network node detects performance degradation, the network node may reconfigure the UE to adjust the pre-configured communication parameters, such as by signaling an offset to be added to a pre-configured communication parameter (e.g., a time offset to add to a pre-configured TA parameter, a power offset to add to a pre-configured PC parameter, or a similar offset to add to another communication parameter), or else by signaling that the UE should revert to a legacy procedure (e.g., adjusting a TA parameter based at least in part on a signaled TAC, adjusting an uplink transmit power based at least in part on measuring PL reference signals, or the like). In this way, the network node and the UE may maintain a robust wireless communication link in dynamic RF environments, thereby reducing communication errors between the network node and the UE, and thus conserving power, computing, and network resources that otherwise would be required to correct communication errors.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., network nodes 110, which may correspond to BSs and/or a disaggregated portions thereof, described in more detail below in connection with FIG. 3), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes network nodes 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

Network nodes 110 may wirelessly communicate with (e.g., transmit signals to or receive signals from) UEs 120 via communications links 170. The communications links 170 between network nodes 110 and UEs 120 may carry uplink (UL) (also referred to as reverse link) transmissions from a UE 120 to a network node 110 and/or downlink (DL) (also referred to as forward link) transmissions from a network node 110 to a UE 120. The communications links 170 may use multiple-input and multiple-output (MIMO) antenna technology, including spatial multiplexing, beamforming, and/or transmit diversity in various aspects.

A network node 110 may include, for example, a NodeB (NB), an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A network node 110 may provide communications coverage for a respective geographic coverage area 112, which may sometimes be referred to as a cell, and which may overlap in some cases (e.g., a small cell provided by a network node 110a may have a coverage area 112' that overlaps the coverage area 112 of a macro cell). A network node 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
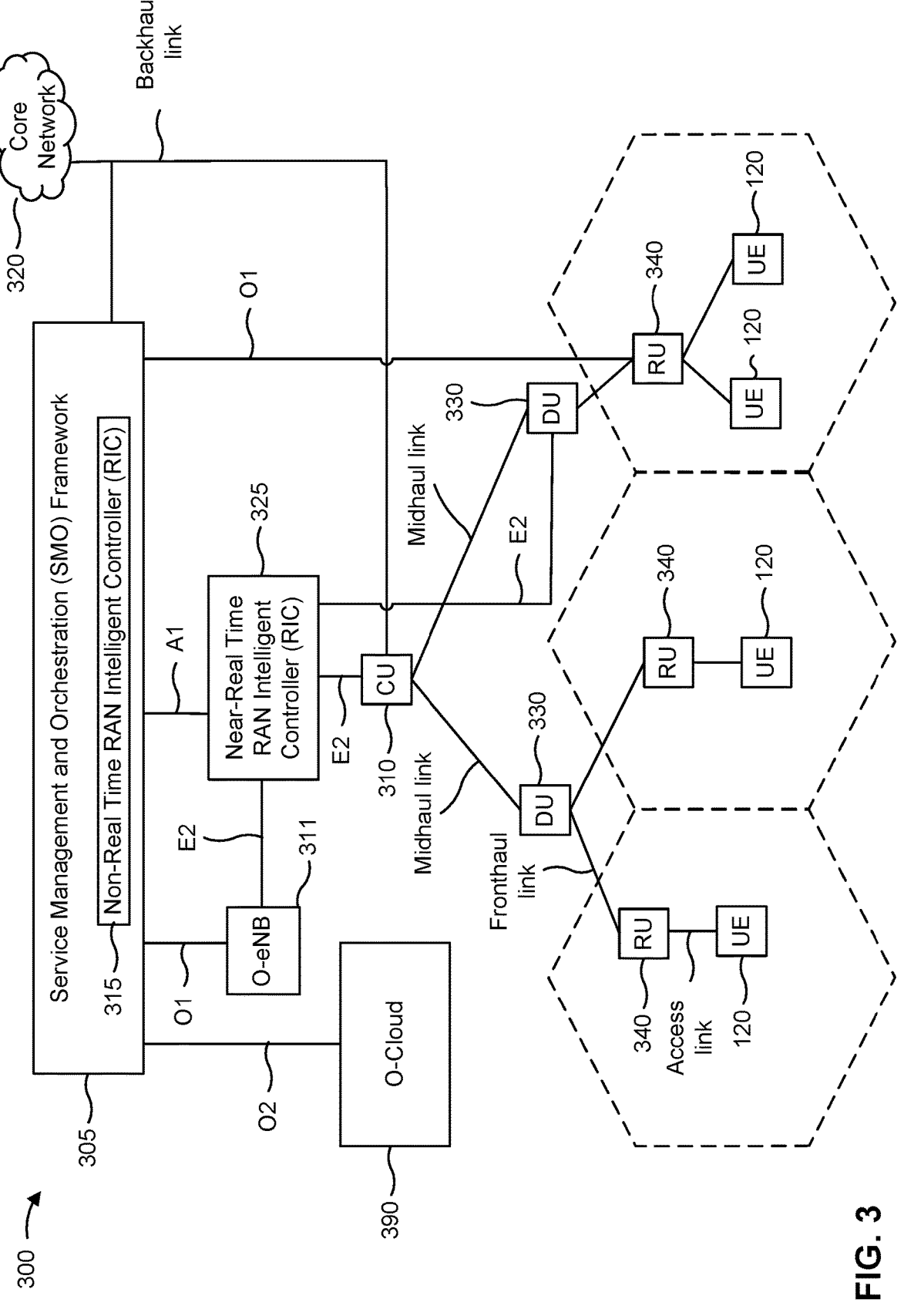
FIG. 3 depicts an example disaggregated base station architecture, in accordance with the present disclosure.

While network nodes 110 are depicted in various aspects as unitary communications devices, network nodes 110 may be implemented in various configurations. For example, one or more components of a network node may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a network node may be virtualized. More generally, a network node (e.g., network node 110) may include components that are located at a single physical location or components located at various physical locations. In examples in which a network node includes components that are located at various physical locations, the various components may each perform functions such that, collectively, the various components achieve functionality that is similar to a network node that is located at a single physical location (e.g., a base station). In some aspects, a network node including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different network nodes 110 within wireless communications network 100 may also be configured to support different radio access technologies, such as 3G, 4G, and/or 5G, among other examples. For example, network nodes 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Network nodes 110 configured for 5G (e.g., 5G NR or Next Generation RAN (NG-RAN)) may interface with 5GC 190 through second backhaul links 184. Network nodes 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 megahertz (MHz)-7125 MHz, which is often referred to (interchangeably) as "Sub-6 gigahertz (GHz)". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave network node such as network node 110*b*) may utilize beamforming (e.g., as shown by 182) with a UE (e.g., 120) to improve path loss and range.

The communications links 170 between network nodes 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain network nodes (e.g., network node 110*b* in FIG. 1) may utilize beamforming with a UE 120 to improve path loss and range, as shown at 182. For example, network node 110*b* and the UE 120 may each include a plurality of antennas, such as antenna elements, antenna panels, and/or antenna arrays to facilitate the beamforming. In some cases, network node 110*b* may transmit a beamformed signal to UE 120 in one or more transmit directions 182'. UE 120 may receive the beamformed signal from the network node 110*b* in one or more receive directions 182". UE 120 may also transmit a beamformed signal to the network node 110*b* in one or more transmit directions 182". Network node 110*b* may also receive the beamformed signal from UE 120 in one or more receive directions 182'. Network node 110*b* and UE 120 may then perform beam training to determine the best receive and transmit directions for each of network node 110*b* and UE 120. Notably, the transmit and receive directions for network node 110*b* may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
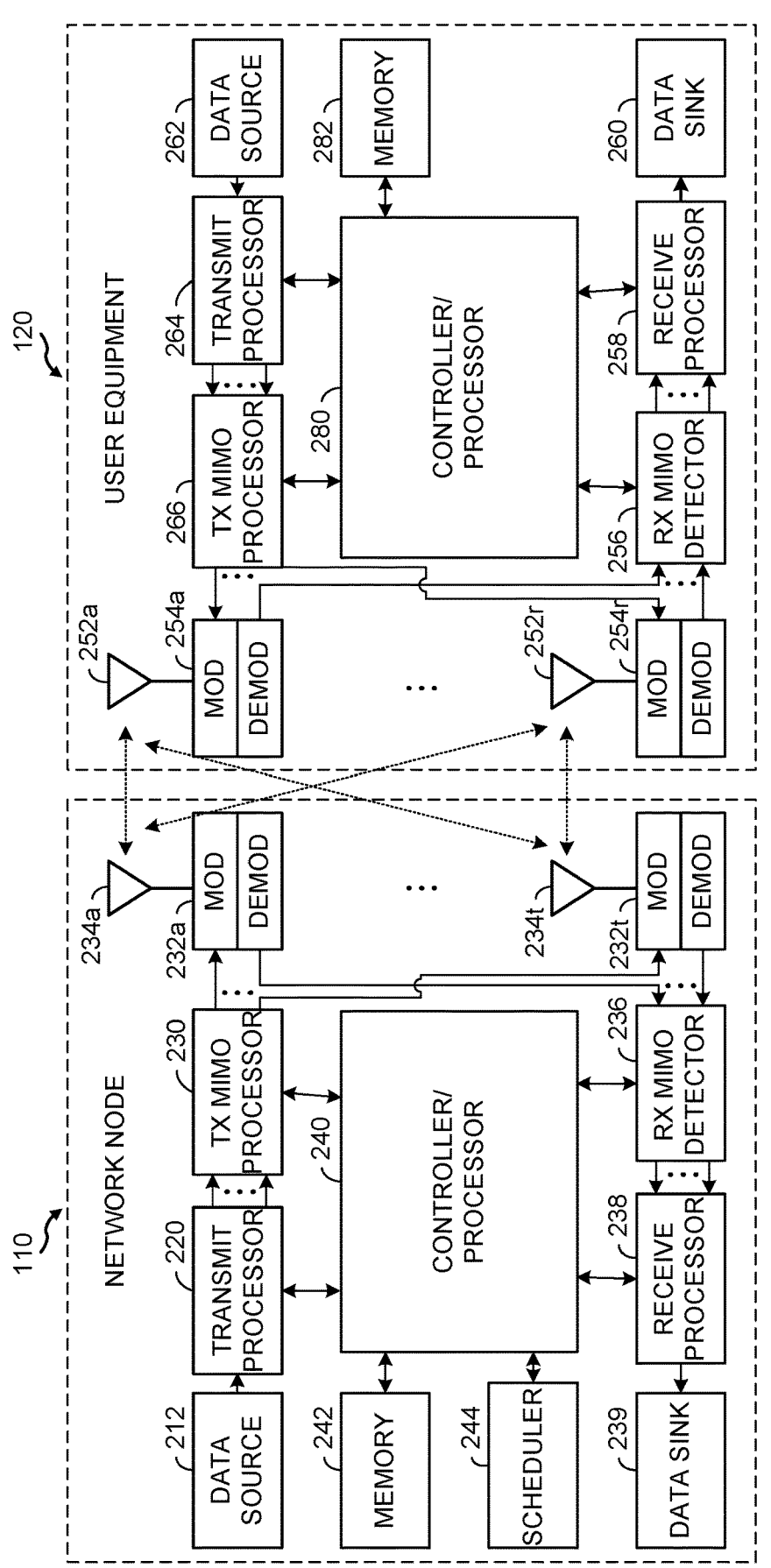
FIG. 2 depicts aspects of an example network node and UE, in accordance with the present disclosure.

FIG. 2 depicts aspects of an example network node 110 and UE 120, in accordance with the present disclosure.

Generally, network node 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, network node 110 may send and receive data between network node 110 and UE 120. Network node 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, network node 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the network node 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM)), and transmitted to network node 110.

At network node 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for network node 110 and UE 120, respectively. Scheduler 244 may schedule UEs for data transmission on the downlink and/or uplink.

In various aspects, network node 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, receive (RX) MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a NB, an eNB, an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
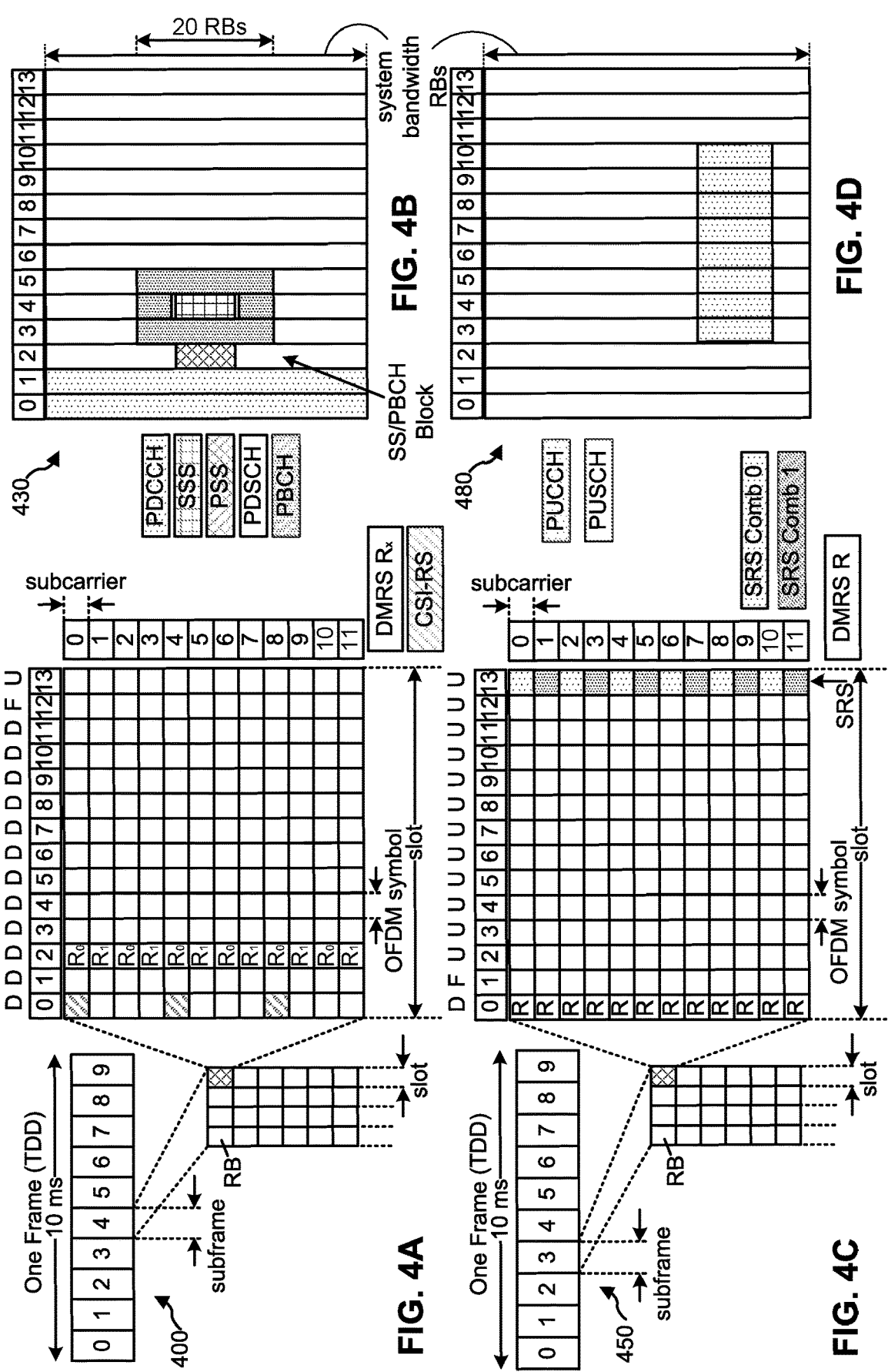
FIGS. 4A, 4B, 4C, and 4D depict aspects of data structures for a wireless communications network, such as wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and SC-FDM partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (p) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (SSB). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement (ACK)/negative acknowledgement (NACK) feedback. The PUSCH carries data, and may additionally be used to carry a buffer status report (BSR), a power headroom report (PHR), and/or UCI.

In some cases, a UE 120 and a network node 110 may communicate (e.g., via one of the subframes described above) according to various communication parameters configured by the network node 110. For example, the network node 110 may configure the UE 120 with one or more transmission configuration indicator (TCI) states for communication (e.g., one or more beams for communication), a TA parameter to be used for communication, and/or a PC parameter to be used for communication, among other communication parameters. Aspects of various communication parameters are described in more detail below in connection with FIG. 5.

Figure 5:
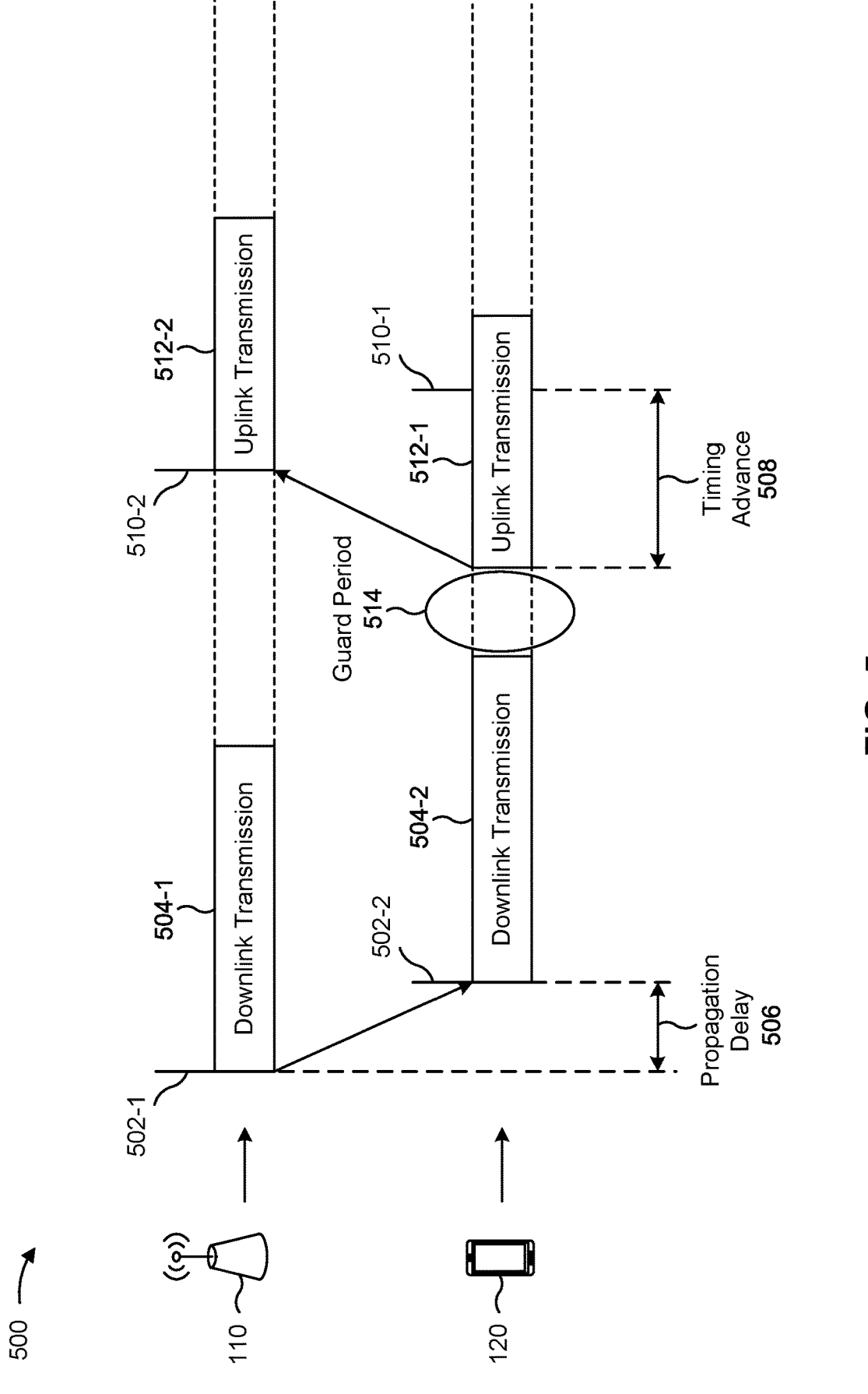
FIG. 5 is a diagram illustrating an example of downlink and uplink transmissions between a network node and a UE in a wireless network, in accordance with the present disclosure.

FIG. 5 is a diagram illustrating an example 500 of downlink and uplink transmissions between a network node 110 and a UE 120 in a wireless communications network 100, in accordance with the present disclosure. In some examples, the downlink and/or uplink transmissions are based at least in part on a TA and/or a guard period between communications. As one example, a network node 110 may configure a downlink transmission to end before the start of a guard period. As another example, the UE 120 may advance a start time for an uplink transmission based at least in part on a TA.

As shown by reference number 502-1, a network node 110 may begin a downlink transmission 504-1 to a UE 120 at a first point in time. In some examples, the first point in time may be based at least in part on a timing scheme defined by a telecommunication system and/or telecommunication standard. To illustrate, the telecommunication standard may define various time partitions for scheduling transmissions between devices, such as the frames and/or subframes described above in connection with FIGS. 4A-4D. Thus, the first point in time as shown by the reference number 502-1 may be based at least in part on a time partition as defined by a telecommunication system (e.g., a frame, a subframe, a slot, a mini-slot, and/or a symbol).

In some examples, the network node 110 and the UE 120 may wirelessly communicate with one another (e.g., directly or via one or more network nodes) based at least in part on the defined time partitions. However, each device may have different timing references for the time partitions. To illustrate, and as shown by the reference number 502-1, the network node 110 may begin the downlink transmission 504-1 at a particular point in time that may be associated with a defined time partition based at least in part on a time perspective of the network node 110. For example, the network node 110 may associate the particular point in time with a defined time partition, such as a beginning of a symbol, a beginning of a slot, a beginning of a subframe, and/or a beginning of a frame. However, the downlink transmission may incur a propagation delay 506 in time, such as a time delay based at least in part on the downlink transmission traveling between a network node 110 (e.g., an RU, a TRP, or the like) and the UE 120. As shown by reference number 502-2, the UE 120 may receive downlink transmission 504-2 (corresponding to downlink transmission 504-1 transmitted by the network node 110) at a second point in time that is later in time relative to the first point in time. From a time perspective of the UE 120, however, the UE 120 may associate the second point in physical time shown by the reference number 502-2 with the same particular point in time of the defined time partition as the network node 110 (e.g., a beginning of the same symbol, a beginning of the same mini-slot, a beginning of the same slot, a beginning of the same subframe, and/or a beginning of the same frame). Thus, as shown by the example 500, the time perspective of the UE 120 may be delayed in time from the time perspective of the network node 110.

In wireless communication technologies like 4G/LTE and 5G/NR, a TA parameter is used to control a timing of uplink transmissions by a UE 120 such that the uplink transmissions are received by a network node 110 (e.g., an RU, a TRP, or the like) at a time that aligns with an internal timing of the network node 110. A network node 110 may determine the TA parameter to a UE 120 (e.g., directly or via one or more network nodes) by measuring a time difference between reception of uplink transmissions from the UE 120 and a subframe timing used by the network node 110 (e.g., by determining a difference between when the uplink transmissions were supposed to have been received by the network node 110, according to the subframe timing, and when the uplink transmissions were actually received). The network node 110 may transmit a TAC to instruct the UE 120 to transmit future uplink communications earlier or later to reduce or eliminate the time difference and align timing between the UE 120 and network node 110. The TAC is used to offset timing differences between the UE 120 and the network node 110 due to different propagation delays that occur when the UE 120 is different distances from the network node 110. If TACs were not used, then uplink transmissions from different UEs 120 (e.g., located at different distances from the network node 110) may collide due to mistiming even if the uplink transmissions are scheduled for different subframes.

To illustrate, without adjusting a start time of an uplink transmission, the UE 120 may be configured to begin an uplink transmission at a scheduled point in time based at least in part on the defined time partitions as described elsewhere herein. As shown by reference number 510-1, a start of the scheduled point in time may occur at a third physical point in time based at least in part on the timing perspective of the UE 120. However, and as shown by reference number 510-2, the scheduled point in time with reference to the timing perspective of the network node 110 (e.g., an RU) may occur at a fourth point in physical time that occurs before the third point in physical time as shown by the reference number 510-1. Accordingly, the network node 110 may instruct the UE 120 (e.g., directly or via one or more network nodes) to apply a timing advance 508 to an uplink transmission to better align reception of the uplink transmission with the timing perspective of the network node 110. However, in some examples, the fourth point in time shown by the reference number 510-2 may occur at or near a same physical point in time as the third point in time shown by the reference number 510-1 such that uplink transmissions from the UE 120 to the network node 110 incur the propagation delay 506. In such a scenario, the network node 110 may instruct the UE 120 to apply a TA with a time duration corresponding to the propagation delay 506.

As shown by the example 500, the UE 120 may adjust a start time of an uplink transmission 512-1 based at least in part on the timing advance 508 and the start of the scheduled point in time (e.g., at the third physical point in time shown by the reference number 510-1). Based at least in part on propagation delay, the network node 110 may receive an uplink transmission 512-2 (corresponding to the uplink transmission 512-1 transmitted by the UE 120) at the fourth point in physical time shown by the reference number 510-2.

In some examples, a TA parameter may be based at least in part on twice an estimated propagation delay (e.g., the propagation delay 506) and/or may be based at least in part on a RTT. A network node 110 (e.g., a DU or a CU) may estimate the propagation delay and/or select a TA parameter based at least in part on communications with the UE 120. As one example, the network node 110 may estimate the propagation delay based at least in part on a network access request message from the UE 120. Additionally, or alternatively, the network node 110 may estimate and/or select the TA parameter from a set of fixed TA parameters.

In some examples, a telecommunication system and/or telecommunication standards may define a guard period 514 (e.g., a time duration) between transmissions to provide a device with sufficient time for switching between different transmission and/or reception modes, for transient settling, to provide a margin for timing misalignment between devices, and/or for propagation delays. In some examples, a guard period is a period during which no transmissions or receptions are scheduled and/or allowed to occur. A guard period may provide a device with sufficient time to reconfigure hardware and/or allow the hardware to settle within a threshold value to enable a subsequent transmission. The guard period 514 may sometimes be referred to as a gap, a switching guard period, or a guard interval.

In some examples, a network node 110 (e.g., a DU or a CU) may select a starting transmission time and/or a transmission time duration based at least in part on a receiving device and/or the guard period. For example, the network node 110 may select an amount of content (e.g., data and/or control information) to transmit in the downlink transmission 504-1 based at least in part on beginning the transmission at the first point in time shown by the reference number 502-1 and/or the UE 120 completing reception of the downlink transmission 504-2 prior to a starting point of the guard period 514. Alternatively, or additionally, the UE 120 may select an amount of content (e.g., data and/or control information) to transmit in the uplink transmission 512-1 based at least in part on the timing advance 508, the third point in time shown by the reference number 510-1, and/or refraining from beginning the uplink transmission 512-1 until the guard period 514 has ended.

In some aspects, a UE 120 may be configured with one or more TA groups (TAGs). "TAG" may refer to a group of cells which share the same uplink timing. When a UE 120 is in communication with multiple TRPs, the multiple TRPs may be associated with a common TAG for purposes of TA control procedures, while, in some other aspects, the TRPs may be associated with different TAGs for purposes of TA control procedures. More particularly, if the TRPs are near to one another, they may experience similar propagation delays with respect to communications with the UE 120. Thus, two or more TRPs may form part of a single TAG, meaning that the TRPs share the same uplink transmission timing (e.g., they are subject to the same timing advance 508). However, TRPs that are geographically separated or otherwise relatively far from one another may experience different propagation delays with respect to communications with the UE 120, and thus two or more TRPs may be associated with different uplink transmission timings and thus different TAGs (e.g., they may be subject to different timing advances 508). In cases in which a UE 120 is in communication with two or more TRPs, with each TRP being associated with a different TA parameter, the UE 120 may thus receive multiple TACs in order to separately establish a timing advance 508 for each TAG (e.g., for each TRP).

In some cases, a timing advance 508 associated with the UE 120 may need to be updated or otherwise adjusted. For example, if the UE 120 moves from one location (e.g., one geographic location) to another location (e.g., a different geographic location), the UE 120 may be either further away from, or closer to, the network node 110, resulting in a different propagation delay 506 associated with communications between the network node 110 and the UE 120. Accordingly, the UE 120 may need to adjust the timing advance 508 such that communications between the network node 110 and the UE 120 are synchronized in the manner described above (e.g., such that the uplink transmission 512-1 arrives at the network node 110 at the fourth point in time shown by the reference number 510-2, as described). This may require high signaling overhead and/or high power, computing, and network resource consumption associated with the UE 120 and the network node 110 signaling TA adjustment information.

Additionally, or alternatively, a UE 120 may be configured with one or more PC parameters for communicating with a network node 110. For example, in some examples, a UE 120 may be configured to adjust a transmit power level based at least in part on a measured path loss between the UE 120 and the network node 110, among other information. In some examples, a UE 120 may adjust a transmit power level according to a power transmit formula associated with one or more configured and/or measured parameters. For example, a wireless communication device (e.g., a UE 120) may adjust a transmit power level in a PUSCH based at least in part on the formula $$P_{PUSCH}(i, j, q_d, l) = \min\{P_{CMAX}(i),$$

$$P_{O\_PUSCH}(j) + 10\log_{10}\left(2^{\mu} \times M_{RB}^{PUSCH}(i)\right) + \alpha(j) \times PL(q_d) + \Delta_{TF}(i) + f(i, l)\},$$

which is sometimes referred to as an uplink power control formula. In the uplink power control formula, $P_{CMAX}$ corresponds to the UE configured maximum output power, and $$P_{O\_PUSCH}(j), \mu, M_{RB}^{PUSCH}(i), \alpha(j), PL(q_d), \Delta_{TF}(i), \text{ and } f(i, l)$$

correspond to the variables defined in section 7.1.1 of Technical Specification (TS) 38.213, version 17.4.0, promulgated by the 3GPP. In some cases, a transmit power for signals and/or channels other than a PUSCH (e.g., a PUCCH, an SRS, or a similar channel and/or signal) may be based at least in part on a different, but similar, formula than the example uplink power control formula described above.

In this regard, uplink transmit power may be a function of a downlink path loss estimate (e.g., $PL(q_d)$), among the other PC parameters described above. In some cases, path loss estimation may be performed based at least in part on receiving a path loss reference signal by the UE 120. For example, $PL(q_d)$ may correspond to a downlink path loss estimate, in decibels (dB), calculated by the UE 120 using reference signal index $q_d$ for the active downlink bandwidth part (BWP). In some examples, a path loss reference signal may be associated with an SSB, a CSI-RS, or a similar reference signal. Moreover, in mmWave communications, different beamforming channels may be associated with different path loss and/or different path loss estimates. Accordingly, each beamforming channel and/or beam may be indicated by a TCI state and/or spatial relationship information, with different TCI states being associated with different path loss reference signals.

A UE 120 may track configured path loss reference signals and estimate path loss to determine an uplink power control of a corresponding uplink channel. In some aspects, a maximum allowed number of path loss reference signals may be smaller than a number of TCI states and/or spatial relationships (e.g., beams) associated with the UE 120. For example, a UE 120 capability may support a maximum of 64 spatial relationships (e.g., a maxNrofSpatialRelationInfos-r16 parameter may be equal to 64) and/or a maximum of 64 candidate beams (e.g., a maxNrofCandidateBeams-r16 parameter may be equal to 64), but the maximum number of path loss reference signals configured at the UE 120 may be less than 64 (e.g., in some examples, the maximum number of path loss reference signals configured at the UE 120 may be equal to four). In some aspects, a path loss reference signal configuration may be updated only by a MAC control element (MAC-CE) and/or RRC signaling. This may require high signaling overhead and/or high power, computing, and network resource consumption associated with signaling between the UE 120 and the network node 110 for PC adjustment purposes.

Some techniques and apparatuses described herein enable pre-configured TA parameters and/or pre-configured PC parameters for UEs moving in a trajectory that is highly deterministic, such as a UE moving on a high-speed train between stations, a UE associated with robotics in a factory or warehouse environment, or other UEs associated with deterministic trajectories. In such examples, a wireless link to a moving UE may change over time but may be highly predictable and/or deterministic as a function of time and/or the UE's location. In that regard, communication parameters, such as a TA parameter and/or a PC parameter, may be pre-configured at the UE as a function of time and/or the UE's location in the trajectory, and thus the UE and/or a network node may autonomously update (e.g., update without further signaling) a communication configuration based at least in part on time and/or the UE's location. For example, a UE may update its TA based at least in part on a slot number, a time offset from a predefined reference point, a measured reference signal received power (RSRP) of a beam, and/or location information (e.g., obtained from a global navigation satellite system (GNSS), a positioning reference signal (PRS), an on-board sensor, or the like). Moreover, a UE may update a PC parameter (e.g., a path loss estimate) based at least in part on a slot number, a time offset from a predefined reference point, and/or location information (e.g., obtained from a GNSS, a PRS, an on-board sensor, or the like), and/or the UE may skip monitoring one or more path loss reference signals or else the UE may measure a subset of path loss reference signals to estimate path loss associated with uplink links. As a result, signaling overhead associated with TA and/or PC adjustment may be reduced, resulting in reduced power, computing, and network resource consumption.

As indicated above, FIG. 5 is provided as an example. Other examples may differ from what is described with regard to FIG. 5.

Figure 6:
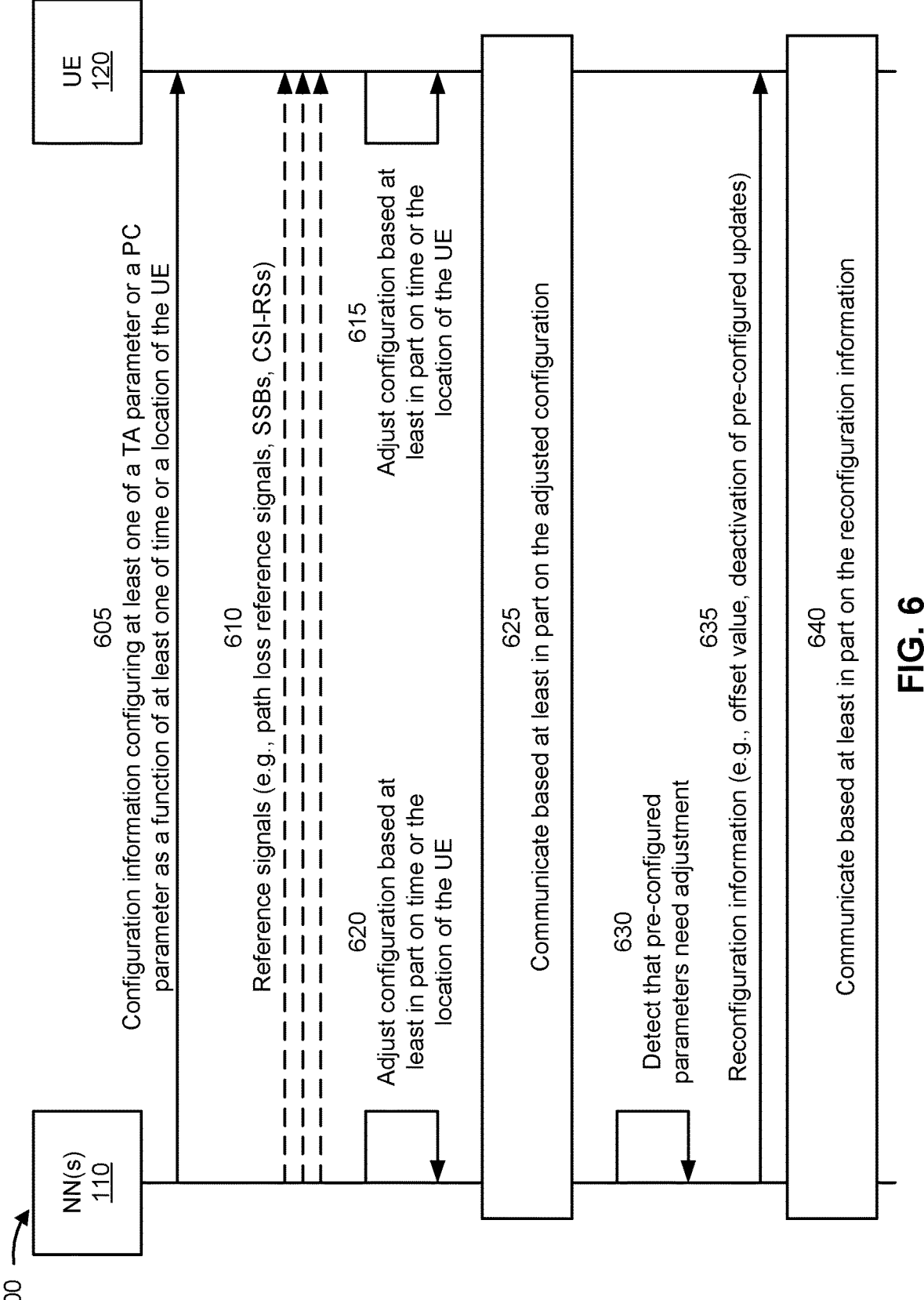
FIG. 6 is a diagram of an example associated with a configuration of communication parameters based at least in part on time or a location of a UE, in accordance with the present disclosure.

FIG. 6 is a diagram of an example 600 associated with a configuration of communication parameters based at least in part on time or a location of a UE, in accordance with the present disclosure. As shown in FIG. 6, a network node 110 (e.g., a CU, a DU, and/or an RU) may communicate with a UE 120. In some aspects, the network node 110 and the UE 120 may be part of a wireless network (e.g., wireless communications network 100). The network node 110 and the UE 120 may have established a wireless connection prior to operations shown in FIG. 6. In some aspects, the UE 120 may be associated with a trajectory that is highly deterministic. For example, the UE 120 may be a UE moving on a high-speed train between stations, a UE associated with robotics in a factory or warehouse environment, or a similar type of UE associated with a deterministic trajectory. In that regard, in some aspects, a wireless link between the network node 110 and the moving UE 120 may change over time but may be highly predictable and/or deterministic as a function of time and/or a location of the UE 120.

As shown by reference number 605, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may preconfigure certain communication parameters at the UE 120 as a function of time and/or a location of the UE 120, such as a location of the UE 120 in a deterministic trajectory. Communication parameters that are configured as a function of time and/or a location of the UE 120 are sometimes referred to herein as "time-dependent" and/or "location-dependent" parameters, for ease of discussion. For example, the configuration information may configure a time-dependent and/or location-dependent TA parameter and/or a PC parameter. In some aspects, the configuration information may configure the TA parameter and/or the PC parameter as a function of time by configuring the TA parameter and/or the PC parameter as a function of a slot number. In some other aspects, the configuration information may configure the TA parameter and/or the PC parameter as a function of time by configuring the TA parameter and/or the PC parameter as a function of a time offset from a reference point (sometimes referred to as a "zero time" reference point). Additionally, or alternatively, the configuration information may configure multiple TA parameters and/or multiple PC parameters as a function of time and/or a location of the UE 120. For example, the configuration information may configure multiple time-dependent and/or location-dependent TA parameters and/or PC parameters, with each of the multiple TA parameters and/or PC parameters being associated with a corresponding TCI state (e.g., the configuration information may configure a time-dependent and/or a location-dependent TA parameter and/or PC parameter for each beam associated with the UE 120).

In some aspects, the configuration information may configure the TA parameter and/or the PC parameter as a function of the location of the UE by configuring the TA parameter and/or the PC parameter as a function of a measured RSRP associated with a reference signal (e.g., one of the reference signals described below in more detail in connection with reference number 610). For example, the UE 120 may be configured to measure a downlink reference signal that is associated with an uplink transmission (e.g., a PUSCH transmission, a PUCCH transmission, or a similar transmission), and compute a TA and/or a transmit power level to be used for the uplink transmission based at least in part on a pre-configured formula configured by the configuration information that uses the measured RSRP as an input. As described in more detail below in connection with reference number 610, in some aspects, the downlink reference signal may be a source reference signal (e.g., an SSB) of the uplink TCI state for the uplink transmission, and/or the RSRP used to compute a TA and/or a transmit power level may be an average RSRP over multiple measurements performed by the UE 120.

In some aspects, the configuration information may configure the TA parameter and/or the PC parameter as a function of the location of the UE 120 by configuring the TA parameter and/or the PC parameter as a function of information associated with at least one of a GNSS, a PRS, and/or an on-board sensor associated with the UE 120. For example, in aspects in which the UE 120 is associated with robotics in a factory and/or warehouse environment, the UE 120 may include an on-board sensor configured to measure a height of a robotic arm or similar robotic component, and thus update a TA parameter and/or a PC parameter based at least in part on the height of the robotic arm or similar robotic component.

As described above in connection with FIG. 5, in some aspects, a UE 120 may be configured to compute a transmit power level based at least in part on an uplink transmit power control formula. Accordingly, in some aspects, the configuration information may configure the PC parameter as a function of time and/or the location of the UE 120 by configuring at least one parameter of a power control function as a function of time and/or the location of the UE 120. For example, one or more of $P_{O\_PUSCH}(j)$, $\alpha(j)$, $PL(q_d)$ (e.g., a path loss estimate parameter), a closed loop index, and/or a similar parameter associated with a power control function may be configured as a function of time and/or a location of the UE 120. More particularly, the configuration information may configure a path loss parameter as a function of time, such that the UE 120 may skip monitoring path loss reference signals of beams and instead use a pre-configured formula to compute a path loss, and then use the computed path loss in an uplink power control formula to determine an uplink transmit power. Additionally, or alternatively, the UE 120 may be configured to measure path loss reference signals associated with only a subset of uplink beams, and use the measured path loss reference signals and a pre-configured formula as a function of time and/or a location of the UE 120 to estimate path loss associated with all uplink links (e.g., all beams), which is described in more detail below in connection with reference number 610.

The UE 120 may configure itself based at least in part on the configuration information. In some aspects, the UE 120 may be configured to perform one or more operations described herein based at least in part on the configuration information.

As shown by reference number 610, the network node 110 may transmit, and the UE 120 may receive, one or more reference signals. For example, the network node 110 may transmit one or more reference signals associated with the UE 120 performing RSRP measurements, such as for purposes of computing a TA parameter and/or a PC parameter using a pre-configured formula associated with measured RSRPs. In such aspects, the one or more reference signals may be associated with a source SSB associated with an uplink TCI state associated with an uplink transmission, or a similar reference signal. In some other aspects, the one or more reference signals may be one or more path loss reference signals. In such aspects, the one or more reference signals may be associated with one or more SSBs, one or more CSI-RSs, or similar reference signals.

As described above in connection with reference number 605, in some aspects, the UE 120 may skip monitoring one or more reference signals. For example, in aspects in which the UE 120 is pre-configured with a formula to estimate a path loss parameter associated with an uplink power control formula as a function of time and/or the location of the UE 120, the UE 120 may skip monitoring one or more path loss reference signals based at least in part on the configuration information (as indicated in FIG. 6 by the dashed arrows accompanying reference number 610), and instead estimate path loss according to the formula. Additionally, or alternatively, in aspects in which the UE 120 is configured to monitor only a subset of path loss reference signals and estimate path loss for all uplink links based at least in part on the subset of reference signals, the UE 120 may monitor, based at least in part on the configuration information, only a subset of a set of path loss reference signals shown in FIG. 6 and thus estimate the path loss for all links based at least in part on the measured subset of reference signals.

As shown by reference numbers 615 and 620, the UE 120 and/or the network node 110 may autonomously update a configuration based at least in part on time and/or a location of the UE 120 without requiring further signaling from the network node 110 to the UE 120. For example, in aspects in which the UE 120 is configured with a TA parameter and/or a PC parameter as a function of time and/or a location of the UE 120, the UE 120 and/or the network node 110 may autonomously adjust the TA parameter and/or the PC parameter based at least in part on time and/or the location of the UE, resulting in one or more adjusted communication parameters. More particularly, in aspects in which the configuration information configures the TA parameter and/or the PC parameter as a function of a slot number, the UE 120 and/or the network node 110 may adjust the TA parameter and/or the PC parameter based at least in part on the slot number. Additionally, or alternatively, in aspects in which the configuration information configures the TA parameter and/or the PC parameter as a function of a time offset from a reference point (e.g., a zero time reference point), the UE 120 and/or the network node 110 may adjust the TA parameter and/or the PC parameter based at least in part on the time offset.

Additionally, or alternatively, in aspects in which the configuration information configures the TA parameter and/or the PC parameter as a function of a measured RSRP associated with a reference signal (e.g., one of the reference signals described above in more detail in connection with reference number 610), the UE 120 may adjust the TA parameter and/or the PC parameter based at least in part on the measured RSRP associated with the reference signal. In some aspects, the measured RSRP value may correspond to an average RSRP value over multiple measurement occasions, as described above in connection with reference number 605. Additionally, or alternatively, in aspects in which the configuration information configures the TA parameter and/or the PC parameter as a function of information associated with at least one of a GNSS, a PRS, and/or an on-board sensor associated with the UE 120, the UE 120 may adjust the TA parameter and/or the PC parameter based at least in part on the information associated with the GNSS, the PRS, and/or the on-board sensor associated with the UE 120.

Moreover, in aspects in which the configuration information configures at least one parameter of a power control function as a function of time and/or the location of the UE 120, the UE 120 may adjust the at least one parameter of the power control function as a function of time and/or the location of the UE. Additionally, or alternatively, in aspects in which the UE 120 is configured to measure path loss reference signals associated with only a subset of uplink beams, the UE 120 may compute a power control level based at least in part on measurements associated with the subset of the set of path loss reference signals (e.g., the UE 120 may use the measured path loss reference signals and a pre-configured formula as a function of time and/or a location of the UE 120 to estimate path loss associated with all uplink links (e.g., all beams)).

Based at least in part on pre-configuring certain parameters at the UE 120 as a function of time and/or a location of the UE 120 as described above in connection with reference number 605, and/or the UE 120 and/or the network node 110 autonomously adjusting a configuration based at least in part on time and/or a location of the UE 120 as described above in connection with reference numbers 615 and 620, the UE 120 and the network node 110 may communicate with adjusted communication parameters as the UE 120 moves in a deterministic trajectory without requiring extensive signaling between the network node 110 and the UE 120. More particularly, as shown by reference number 625, the network node 110 and/or the UE 120 may communicate based at least in part on the one or more adjusted communication parameters. In some aspects, communicating based at least in part on the one or more adjusted communication parameters may include the UE 120 transmitting an uplink transmission based at least in part on an autonomously adjusted timing advance and/or an autonomously adjusted transmit power level.

In some aspects, such as in aspects in which a surrounding RF environment of the UE 120 changes, the pre-configured TA parameter and/or PC parameter may not perform as expected, and thus the network node 110 may reconfigure the UE 120 with an updated time-dependent and/or location-dependent TA parameter and/or PC parameter, or otherwise reconfigure the UE 120 to utilize a fallback configuration (e.g., a legacy configuration, in which more signaling between the network node 110 and/or the UE 120 is utilized to configure a TA and/or a transmit power level). More particularly, as shown by reference number 630, the network node 110 may monitor an uplink transmission from the UE 120 and identify performance degradation, which may indicate that one or more pre-configured parameters may need adjustment. Accordingly, as indicated by reference number 635, the network node 110 may transmit, and the UE 120 may receive, reconfiguration information reconfiguring the at least one of the TA parameter or the power control parameter.

For example, in aspects in which the configuration information configured the TA parameter as a function of time and/or a location of the UE 120, the reconfiguration information may indicate an offset value associated with the TA parameter. The offset value may be a time period added to a TA parameter being used by the UE 120, to compensate for the degraded performance, such as a positive or negative time offset to be added to a currently utilized TA. In some aspects, the UE 120 may maintain the offset value after updating the TA, while, in some other aspects, the UE 120 may discard the offset value after updating the TA. In some other aspects, the reconfiguration information may deactivate a configuration of the TA parameter as a function of time and/or a location of the UE, and thus the network node 110 may revert to signaling TA parameters according to a legacy procedure (e.g., such as by signaling TACs as described above in connection with FIG. 5).

In aspects in which the configuration information configured the PC parameter as a function of time and/or a location of the UE 120, the reconfiguration information may indicate an offset value associated with the PC parameter. The offset value may be a power offset value (e.g., in dB) added to a PC parameter being used by the UE 120, to compensate for the degraded performance, such as a positive or negative power offset to be added to a currently utilized PC parameter. For example, in aspects in which the configuration information configured a path loss parameter as a function of time and/or a location of the UE 120, the network node may determine that the UE 120 is suffering X dB higher path loss than usual due to blocking loss or the like, and thus the network node 110 may reconfigure the UE 120 to increase a path loss estimation by an offset of X dB from a result obtained from a previously configured formula (e.g., a time-dependent and/or location-dependent path loss formula configured by the configuration information, as described above in connection with reference number 605). In some aspects, the reconfiguration information may deactivate a configuration of the PC parameter as a function of time and/or a location of the UE, and thus the UE 120 may revert to power control under a legacy procedure (e.g., the UE 120 may resume a measurement-based procedure to adjust a PC configuration, such as by measuring multiple path loss reference signals, as described above in connection with FIG. 5).

As shown by reference number 640, the network node 110 and/or the UE 120 may communicate based at least in part on the reconfiguration information. In some aspects, communicating based at least in part on the reconfiguration information may include the UE 120 transmitting an uplink transmission based at least in part on a TA parameter and/or a PC parameter adjusted according to an offset value signaled by the reconfiguration information, and/or transmitting an uplink transmission based at least in part on a TA parameter and/or a PC parameter adjusted according to a legacy procedure (e.g., when the reconfiguration information deactivates the time-dependent and/or location-dependent TA parameter and/or PC parameter).

Based at least in part on the network node 110 and/or the UE 120 autonomously adjusting a communication parameter (e.g., a TA parameter and/or a PC parameter) as a function of time and/or location of the UE 120, the UE 120 and/or the network node 110 may conserve computing, power, network, and/or communication resources that may have otherwise been consumed by legacy TA and/or PC adjustment procedures. For example, based at least in part on the network node 110 and/or the UE 120 autonomously adjusting a communication parameter as a function of time and/or location of the UE 120, the UE 120 and the network node 110 may communicate with a reduced signaling overhead and/or with reduced power, computing, and network resource consumption associated with performing legacy TA and/or PC adjustment procedures.

As indicated above, FIG. 6 is provided as an example. Other examples may differ from what is described with respect to FIG. 6.

FIG. 7 shows a method 700 for wireless communications by a UE, such as UE 120.

Method 700 begins at 710 with receiving configuration information configuring at least one of a timing advance parameter or a power control parameter as a function of at least one of time or a location of the UE.

Method 700 then proceeds to step 720 with adjusting the at least one of the timing advance parameter or the power control parameter based at least in part on the at least one of time or the location of the UE, resulting in one or more adjusted communication parameters.

Method 700 then proceeds to step 730 with communicating based at least in part on the one or more adjusted communication parameters.

In one aspect, the configuration information configures the timing advance parameter as a function of time by configuring the timing advance parameter as a function of a slot number, and adjusting the at least one of the timing advance parameter or the power control parameter includes adjusting the timing advance parameter based at least in part on the slot number.

In one aspect, the configuration information configures the timing advance parameter as a function of time by configuring the timing advance parameter as a function of a time offset from a reference point, and adjusting the at least one of the timing advance parameter or the power control parameter includes adjusting the timing advance parameter based at least in part on the time offset.

In one aspect, the configuration information configures multiple timing advance parameters as a function of time, and each of the multiple timing advance parameters is associated with a corresponding transmission configuration indicator state.

In one aspect, the configuration information configures the timing advance parameter as a function of the location of the UE by configuring the timing advance parameter as a function of a measured RSRP associated with a reference signal, and adjusting the at least one of the timing advance parameter or the power control parameter includes adjusting the timing advance parameter based at least in part on the measured RSRP associated with the reference signal.

In one aspect, the reference signal is associated with a source synchronization signal block associated with an uplink transmission configuration indicator state associated with an uplink transmission.

In one aspect, the measured RSRP is associated with an average RSRP value over multiple measurement occasions.

In one aspect, the configuration information configures the timing advance parameter as a function of the location of the UE by configuring the timing advance parameter as a function of information associated with at least one of a global navigation satellite system, a positioning reference signal, or an on-board sensor associated with the UE, and adjusting the at least one of the timing advance parameter or the power control parameter includes adjusting the timing advance parameter based at least in part on the information associated with the at least one of the global navigation satellite system, the positioning reference signal, or the on-board sensor associated with the UE.

In one aspect, the configuration information configures the power control parameter as a function of time by configuring the power control parameter as a function of a slot number, and adjusting the at least one of the timing advance parameter or the power control parameter includes adjusting the power control parameter based at least in part on the slot number.

In one aspect, the configuration information configures the power control parameter as a function of time by configuring the power control parameter as a function of a time offset from a reference point, and adjusting the at least one of the timing advance parameter or the power control parameter includes adjusting the power control parameter based at least in part on the time offset.

In one aspect, the configuration information configures the power control parameter as a function of the at least one of time or the location of the UE by configuring at least one parameter of a power control function as a function of the at least one of time or the location of the UE, and adjusting the at least one of the timing advance parameter or the power control parameter includes adjusting the at least one parameter of the power control function as a function of the at least one of time or the location of the UE.

In one aspect, the at least one parameter associated with the power control function is associated with a path loss parameter, and method 700 further includes skipping monitoring one or more path loss reference signals based at least in part on the configuration information.

In one aspect, the at least one parameter associated with the power control function is associated with a path loss parameter, and method 700 further includes monitoring, based at least in part on the configuration information, only a subset of a set of path loss reference signals, and computing a power control level based at least in part on measurements associated with the subset of the set of path loss reference signals.

In one aspect, method 700 further includes receiving reconfiguration information reconfiguring the at least one of the timing advance parameter or the power control parameter.

In one aspect, the configuration information configures the timing advance parameter as a function of the at least one of time or the location of the UE, and the reconfiguration information indicates an offset value associated with the timing advance parameter.

In one aspect, the configuration information configures the timing advance parameter as a function of the at least one of time or the location of the UE, and the reconfiguration information deactivates a configuration of the timing advance parameter as a function of the at least one of time or the location of the UE.

In one aspect, the configuration information configures the power control parameter as a function of the at least one of time or the location of the UE, and the reconfiguration information indicates an offset value associated with the power control parameter.

In one aspect, the configuration information configures the power control parameter as a function of the at least one of time or the location of the UE, and the reconfiguration information deactivates a configuration of the power control parameter as a function of the at least one of time or the location of the UE.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

FIG. 8 shows a method 800 for wireless communications by a network node, such as network node 110, or a disaggregated base station as discussed with respect to FIG. 3.

Method 800 begins at 810 with transmitting, to a UE, configuration information configuring at least one of a timing advance parameter or a power control parameter as a function of at least one of time or a location of the UE.

Method 800 then proceeds to step 820 with communicating, with the UE, based at least in part on the at least one of the timing advance parameter or the power control parameter being adjusted according to the at least one of time or the location of the UE.

In one aspect, the configuration information configures the timing advance parameter as a function of time by configuring the timing advance parameter as a function of a slot number.

In one aspect, the configuration information configures the timing advance parameter as a function of time by configuring the timing advance parameter as a function of a time offset from a reference point.

In one aspect, the configuration information configures multiple timing advance parameters as a function of time, and each of the multiple timing advance parameters is associated with a corresponding transmission configuration indicator state.

In one aspect, the configuration information configures the timing advance parameter as a function of the location of the UE by configuring the timing advance parameter as a function of a measured RSRP associated with a reference signal.

In one aspect, the reference signal is associated with a source synchronization signal block associated with an uplink transmission configuration indicator state associated with an uplink transmission.

In one aspect, the measured RSRP is associated with an average RSRP value over multiple measurement occasions.

In one aspect, the configuration information configures the timing advance parameter as a function of the location of the UE by configuring the timing advance parameter as a function of information associated with at least one of a global navigation satellite system, a positioning reference signal, or an on-board sensor associated with the UE.

In one aspect, the configuration information configures the power control parameter as a function of time by configuring the power control parameter as a function of a slot number.

In one aspect, the configuration information configures the power control parameter as a function of time by configuring the power control parameter as a function of a time offset from a reference point.

In one aspect, the configuration information configures the power control parameter as a function of the at least one of time or the location of the UE by configuring at least one parameter of a power control function as a function of the at least one of time or the location of the UE.

In one aspect, the at least one parameter associated with the power control function is associated with a path loss parameter, and the configuration information indicates that the UE is to skip monitoring one or more path loss reference signals.

In one aspect, the at least one parameter associated with the power control function is associated with a path loss parameter, and the configuration information indicates that the UE is to monitor only a subset of a set of path loss reference signals and compute a power control level based at least in part on measurements associated with the subset of the set of path loss reference signals.

In one aspect, method 800 further includes transmitting, to the UE, reconfiguration information reconfiguring the at least one of the timing advance parameter or the power control parameter.

In one aspect, the configuration information configures the timing advance parameter as a function of the at least one of time or the location of the UE, and the reconfiguration information indicates an offset value associated with the timing advance parameter.

In one aspect, the configuration information configures the timing advance parameter as a function of the at least one of time or the location of the UE, and the reconfiguration information deactivates a configuration of the timing advance parameter as a function of the at least one of time or the location of the UE.

In one aspect, the configuration information configures the power control parameter as a function of the at least one of time or the location of the UE, and the reconfiguration information indicates an offset value associated with the power control parameter.

In one aspect, the configuration information configures the power control parameter as a function of the at least one of time or the location of the UE, and the reconfiguration information deactivates a configuration of the power control parameter as a function of the at least one of time or the location of the UE.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

FIG. 9 is a diagram illustrating an example of an implementation of code and circuitry for a communications device 900, in accordance with the present disclosure. The communications device 900 may be a UE (e.g., UE 120), or a UE may include the communications device 900.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 258, transmit processor 264, TX MIMO processor 266, and/or controller/processor 280, as described with respect to FIG. 2. The one or more processors 920 are coupled to a computer-readable medium/memory 930 via a bus 906. In various aspects, the computer-readable medium/memory 930 may be representative of memory 282, as described with respect to FIG. 2. In certain aspects, the computer-readable medium/memory 930 is configured to store instructions (e.g., computer-executable code, processor-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

As shown in FIG. 9, the communications device 900 may include circuitry for receiving configuration information configuring at least one of a timing advance parameter or a power control parameter as a function of at least one of time or a location of the UE (circuitry 935).

As shown in FIG. 9, the communications device 900 may include, stored in computer-readable medium/memory 930, code for receiving configuration information configuring at least one of a timing advance parameter or a power control parameter as a function of at least one of time or a location of the UE (code 940).

As shown in FIG. 9, the communications device 900 may include circuitry for adjusting the at least one of the timing advance parameter or the power control parameter based at least in part on the at least one of time or the location of the UE, resulting in one or more adjusted communication parameters (circuitry 945).

As shown in FIG. 9, the communications device 900 may include, stored in computer-readable medium/memory 930, code for adjusting the at least one of the timing advance parameter or the power control parameter based at least in part on the at least one of time or the location of the UE, resulting in one or more adjusted communication parameters (code 950).

As shown in FIG. 9, the communications device 900 may include circuitry for communicating based at least in part on the one or more adjusted communication parameters (circuitry 955).

As shown in FIG. 9, the communications device 900 may include, stored in computer-readable medium/memory 930, code for communicating based at least in part on the one or more adjusted communication parameters (code 960).

Various components of the communications device 900 may provide means for performing the method 700 described with respect to FIG. 7, or any aspect related to it. For example, means for transmitting, sending, or outputting for transmission may include the transceiver(s) 254 and/or antenna(s) 252 of the UE 120 and/or transceiver 908 and antenna 910 of the communications device 900 in FIG. 9. Means for receiving or obtaining may include the transceiver(s) 254 and/or antenna(s) 252 of the UE 120 and/or transceiver 908 and antenna 910 of the communications device 900 in FIG. 9.

FIG. 9 is provided as an example. Other examples may differ from what is described in connection with FIG. 9.

FIG. 10 is a diagram illustrating an example of an implementation of code and circuitry for a communications device 1000, in accordance with the present disclosure. The communications device 1000 may be a network node (such as network node 110 or a disaggregated base station as described with regard to FIG. 3), or a network node may include the communications device 1000.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 3. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 238, transmit processor 220, TX MIMO processor 230, and/or controller/processor 240, as described with respect to FIG. 2. The one or more processors 1020 are coupled to a computer-readable medium/memory 1030 via a bus 1006. In various aspects, the computer-readable medium/memory 1030 may be representative of memory 242, as described with respect to FIG. 2. In certain aspects, the computer-readable medium/memory 1030 is configured to store instructions (e.g., computer-executable code, processor-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

As shown in FIG. 10, the communications device 1000 may include circuitry for transmitting, to a UE, configuration information configuring at least one of a timing advance parameter or a power control parameter as a function of at least one of time or a location of the UE (circuitry 1035).

As shown in FIG. 10, the communications device 1000 may include, stored in computer-readable medium/memory 1030, code for transmitting, to a UE, configuration information configuring at least one of a timing advance parameter or a power control parameter as a function of at least one of time or a location of the UE (code 1040).

As shown in FIG. 10, the communications device 1000 may include circuitry for communicating, with the UE, based at least in part on the at least one of the timing advance parameter or the power control parameter being adjusted according to the at least one of time or the location of the UE (circuitry 1045).

As shown in FIG. 10, the communications device 1000 may include, stored in computer-readable medium/memory 1030, code for communicating, with the UE, based at least in part on the at least one of the timing advance parameter or the power control parameter being adjusted according to the at least one of time or the location of the UE (code 1050).

Various components of the communications device 1000 may provide means for performing the method 800 described with respect to FIG. 8, or any aspect related to it. For example, means for transmitting, sending, or outputting for transmission may include the transceiver(s) 232 and/or antenna(s) 234 of the network node 110 and/or transceiver 1008 and antenna 1010 of the communications device 1000 in FIG. 10. Means for receiving or obtaining may include the transceiver(s) 232 and/or antenna(s) 234 of the network node 110 and/or transceiver 1008 and antenna 1010 of the communications device 1000 in FIG. 10.

FIG. 10 is provided as an example. Other examples may differ from what is described in connection with FIG. 10.

The following provides an overview of some Aspects of the present disclosure:

Aspect 1: A method of wireless communication performed by UE, comprising: receiving configuration information configuring at least one of a timing advance parameter or a power control parameter as a function of at least one of time or a location of the UE; adjusting the at least one of the timing advance parameter or the power control parameter based at least in part on the at least one of time or the location of the UE, resulting in one or more adjusted communication parameters; and communicating based at least in part on the one or more adjusted communication parameters.

Aspect 2: The method of Aspect 1, wherein the configuration information configures the timing advance parameter as a function of time by configuring the timing advance parameter as a function of a slot number, and wherein adjusting the at least one of the timing advance parameter or the power control parameter includes adjusting the timing advance parameter based at least in part on the slot number.

Aspect 3: The method of any of Aspects 1-2, wherein the configuration information configures the timing advance parameter as a function of time by configuring the timing advance parameter as a function of a time offset from a reference point, and wherein adjusting the at least one of the timing advance parameter or the power control parameter includes adjusting the timing advance parameter based at least in part on the time offset.

Aspect 4: The method of any of Aspects 1-3, wherein the configuration information configures multiple timing advance parameters as a function of time, and wherein each of the multiple timing advance parameters is associated with a corresponding transmission configuration indicator state.

Aspect 5: The method of any of Aspects 1-4, wherein the configuration information configures the timing advance parameter as a function of the location of the UE by configuring the timing advance parameter as a function of a measured RSRP associated with a reference signal, and wherein adjusting the at least one of the timing advance parameter or the power control parameter includes adjusting the timing advance parameter based at least in part on the measured RSRP associated with the reference signal.

Aspect 6: The method of Aspect 5, wherein the reference signal is associated with a source synchronization signal block associated with an uplink transmission configuration indicator state associated with an uplink transmission.

Aspect 7: The method of Aspect 5, wherein the measured RSRP is associated with an average RSRP value over multiple measurement occasions.

Aspect 8: The method of any of Aspects 1-7, wherein the configuration information configures the timing advance parameter as a function of the location of the UE by configuring the timing advance parameter as a function of information associated with at least one of a global navigation satellite system, a positioning reference signal, or an on-board sensor associated with the UE, and wherein adjusting the at least one of the timing advance parameter or the power control parameter includes adjusting the timing advance parameter based at least in part on the information associated with the at least one of the global navigation satellite system, the positioning reference signal, or the on-board sensor associated with the UE.

Aspect 9: The method of any of Aspects 1-8, wherein the configuration information configures the power control parameter as a function of time by configuring the power control parameter as a function of a slot number, and wherein adjusting the at least one of the timing advance parameter or the power control parameter includes adjusting the power control parameter based at least in part on the slot number.

Aspect 10: The method of any of Aspects 1-9, wherein the configuration information configures the power control parameter as a function of time by configuring the power control parameter as a function of a time offset from a reference point, and wherein adjusting the at least one of the timing advance parameter or the power control parameter includes adjusting the power control parameter based at least in part on the time offset.

Aspect 11: The method of any of Aspects 1-10, wherein the configuration information configures the power control parameter as a function of the at least one of time or the location of the UE by configuring at least one parameter of a power control function as a function of the at least one of time or the location of the UE, and wherein adjusting the at least one of the timing advance parameter or the power control parameter includes adjusting the at least one parameter of the power control function as a function of the at least one of time or the location of the UE.

Aspect 12: The method of Aspect 11, wherein the at least one parameter associated with the power control function is associated with a path loss parameter, and skipping monitoring one or more path loss reference signals based at least in part on the configuration information.

Aspect 13: The method of Aspect 11, wherein the at least one parameter associated with the power control function is associated with a path loss parameter, and the method further comprises: monitoring, based at least in part on the configuration information, only a subset of a set of path loss reference signals; and computing a power control level based at least in part on measurements associated with the subset of the set of path loss reference signals.

Aspect 14: The method of any of Aspects 1-13, further comprising receiving reconfiguration information reconfiguring the at least one of the timing advance parameter or the power control parameter.

Aspect 15: The method of Aspect 14, wherein the configuration information configures the timing advance parameter as a function of the at least one of time or the location of the UE, and wherein the reconfiguration information indicates an offset value associated with the timing advance parameter.

Aspect 16: The method of Aspect 14, wherein the configuration information configures the timing advance parameter as a function of the at least one of time or the location of the UE, and wherein the reconfiguration information deactivates a configuration of the timing advance parameter as a function of the at least one of time or the location of the UE.

Aspect 17: The method of Aspect 14, wherein the configuration information configures the power control parameter as a function of the at least one of time or the location of the UE, and wherein the reconfiguration information indicates an offset value associated with the power control parameter.

Aspect 18: The method of Aspect 14, wherein the configuration information configures the power control parameter as a function of the at least one of time or the location of the UE, and wherein the reconfiguration information deactivates a configuration of the power control parameter as a function of the at least one of time or the location of the UE.

Aspect 19: A method of wireless communication performed by a network node, comprising: transmitting, to a UE, configuration information configuring at least one of a timing advance parameter or a power control parameter as a function of at least one of time or a location of the UE; and communicating, with the UE, based at least in part on the at least one of the timing advance parameter or the power control parameter being adjusted according to the at least one of time or the location of the UE.

Aspect 20: The method of Aspect 19, wherein the configuration information configures the timing advance parameter as a function of time by configuring the timing advance parameter as a function of a slot number.

Aspect 21: The method of any of Aspects 19-20, wherein the configuration information configures the timing advance parameter as a function of time by configuring the timing advance parameter as a function of a time offset from a reference point.

Aspect 22: The method of any of Aspects 19-21, wherein the configuration information configures multiple timing advance parameters as a function of time, and wherein each of the multiple timing advance parameters is associated with a corresponding transmission configuration indicator state.

Aspect 23: The method of any of Aspects 19-22, wherein the configuration information configures the timing advance parameter as a function of the location of the UE by configuring the timing advance parameter as a function of a measured RSRP associated with a reference signal.

Aspect 24: The method of Aspect 23, wherein the reference signal is associated with a source synchronization signal block associated with an uplink transmission configuration indicator state associated with an uplink transmission.

Aspect 25: The method of Aspect 23, wherein the measured RSRP is associated with an average RSRP value over multiple measurement occasions.

Aspect 26: The method of any of Aspects 19-25, wherein the configuration information configures the timing advance parameter as a function of the location of the UE by configuring the timing advance parameter as a function of information associated with at least one of a global navigation satellite system, a positioning reference signal, or an on-board sensor associated with the UE.

Aspect 27: The method of any of Aspects 19-26, wherein the configuration information configures the power control parameter as a function of time by configuring the power control parameter as a function of a slot number.

Aspect 28: The method of any of Aspects 19-27, wherein the configuration information configures the power control parameter as a function of time by configuring the power control parameter as a function of a time offset from a reference point.

Aspect 29: The method of any of Aspects 19-28, wherein the configuration information configures the power control parameter as a function of the at least one of time or the location of the UE by configuring at least one parameter of a power control function as a function of the at least one of time or the location of the UE.

Aspect 30: The method of Aspect 29, wherein the at least one parameter associated with the power control function is associated with a path loss parameter, and wherein the configuration information indicates that the UE is to skip monitoring one or more path loss reference signals.

Aspect 31: The method of Aspect 29, wherein the at least one parameter associated with the power control function is associated with a path loss parameter, and wherein the configuration information indicates that the UE is to monitor only a subset of a set of path loss reference signals and compute a power control level based at least in part on measurements associated with the subset of the set of path loss reference signals.

Aspect 32: The method of any of Aspects 19-31, further comprising transmitting, to the UE, reconfiguration information reconfiguring the at least one of the timing advance parameter or the power control parameter.

Aspect 33: The method of Aspect 32, wherein the configuration information configures the timing advance parameter as a function of the at least one of time or the location of the UE, and wherein the reconfiguration information indicates an offset value associated with the timing advance parameter.

Aspect 34: The method of Aspect 32, wherein the configuration information configures the timing advance parameter as a function of the at least one of time or the location of the UE, and wherein the reconfiguration information deactivates a configuration of the timing advance parameter as a function of the at least one of time or the location of the UE.

Aspect 35: The method of Aspect 32, wherein the configuration information configures the power control parameter as a function of the at least one of time or the location of the UE, and wherein the reconfiguration information indicates an offset value associated with the power control parameter.

Aspect 36: The method of Aspect 32, wherein the configuration information configures the power control parameter as a function of the at least one of time or the location of the UE, and wherein the reconfiguration information deactivates a configuration of the power control parameter as a function of the at least one of time or the location of the UE.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
   one or more memories; and
   one or more processors coupled to the one or more memories, the one or more processors configured to cause the UE to:
   receive configuration information configuring a timing advance parameter and a power control parameter as a function of time and a function of a location of the UE;
   adjust the timing advance parameter and the power control parameter based at least in part on the time and the location of the UE, resulting in one or more adjusted communication parameters; and
   communicate based at least in part on the one or more adjusted communication parameters.

2. The UE of claim 1, wherein the configuration information configures the timing advance parameter as the function of time by configuring the timing advance parameter as a function of a slot number, and
   wherein the one or more processors, to adjust the timing advance parameter, are configured to adjust the timing advance parameter based at least in part on the slot number.

3. The UE of claim 1, wherein the configuration information configures the timing advance parameter as the function of time by configuring the timing advance parameter as a function of a time offset from a reference point, and
   wherein the one or more processors, to adjust the timing advance parameter, are configured to adjust the timing advance parameter based at least in part on the time offset.

4. The UE of claim 1, wherein the configuration information configures multiple timing advance parameters as the function of time, and
   wherein each of the multiple timing advance parameters is associated with a corresponding transmission configuration indicator state.

5. The UE of claim 1, wherein the configuration information configures the timing advance parameter as the function of the location of the UE by configuring the timing advance parameter as a function of a measured reference signal received power (RSRP) associated with a reference signal, and
   wherein the one or more processors, to adjust the timing advance parameter, are configured to adjust the timing advance parameter based at least in part on the measured RSRP associated with the reference signal.

6. The UE of claim 5, wherein the reference signal is associated with a source synchronization signal block associated with an uplink transmission configuration indicator state associated with an uplink transmission.

7. The UE of claim 5, wherein the measured RSRP is associated with an average RSRP value over multiple measurement occasions.

8. The UE of claim 1, wherein the configuration information configures the timing advance parameter as the function of the location of the UE by configuring the timing advance parameter as a function of information associated with at least one of a global navigation satellite system, a positioning reference signal, or an on-board sensor associated with the UE, and
   wherein the one or more processors, to adjust the timing advance parameter, are configured to adjust the timing advance parameter based at least in part on the information associated with the at least one of the global navigation satellite system, the positioning reference signal, or the on-board sensor associated with the UE.

9. The UE of claim 1, wherein the configuration information configures the power control parameter as the function of time by configuring the power control parameter as a function of a slot number, and
   wherein the one or more processors, to adjust the power control parameter, are configured to adjust the power control parameter based at least in part on the slot number.

10. The UE of claim 1, wherein the configuration information configures the power control parameter as the function of time by configuring the power control parameter as a function of a time offset from a reference point, and
   wherein the one or more processors, to adjust the power control parameter, are configured to adjust the power control parameter based at least in part on the time offset.

11. The UE of claim 1, wherein the configuration information configures the power control parameter as the function of the time and the function of the location of the UE by configuring at least one parameter of a power control function as the function of the time and the function of the location of the UE, and
   wherein the one or more processors, to adjust the power control parameter, are configured to adjust the at least one parameter of the power control function as the function of the time and the function of the location of the UE.

12. The UE of claim 11, wherein the at least one parameter associated with the power control function is associated with a path loss parameter, and
   wherein the one or more processors are further configured skip monitoring one or more path loss reference signals based at least in part on the configuration information.

13. The UE of claim 11, wherein the at least one parameter associated with the power control function is associated with a path loss parameter, and wherein the one or more processors are further configured to:
   monitor, based at least in part on the configuration information, only a subset of a set of path loss reference signals; and
   compute a power control level based at least in part on measurements associated with the subset of the set of path loss reference signals.

14. The UE of claim 1, wherein the one or more processors are further configured to receive reconfiguration information reconfiguring at least one of the timing advance parameter or the power control parameter.

15. The UE of claim 14,
   wherein the reconfiguration information indicates an offset value associated with the timing advance parameter.

16. The UE of claim 14,
   wherein the reconfiguration information deactivates a configuration of the timing advance parameter as the function of the or the function of the location of the UE.

17. The UE of claim 14, wherein the reconfiguration information indicates an off-set value associated with the power control parameter.

18. The UE of claim 14, wherein the reconfiguration information deactivates a configuration of the power control parameter as the function of the time or the function of the location of the UE.

19. A network node for wireless communication, comprising:

one or more memories; and one or more processors coupled to the one or more memories, the one or more processors configured to cause the network node to:

transmit, to a user equipment (UE), configuration information configuring a timing advance parameter and a power control parameter as a function of time and a function of a location of the UE; and communicate, with the UE, based at least in part on the timing advance parameter and the power control parameter being adjusted according to the time and the location of the UE.

20. The network node of claim 19, wherein the configuration information configures the timing advance parameter as the function of time by configuring the timing advance parameter as a function of a slot number.

21. The network node of claim 19, wherein the configuration information configures the timing advance parameter as the function of time by configuring the timing advance parameter as a function of a time offset from a reference point.

22. The network node of claim 19, wherein the configuration information configures the timing advance parameter as the function of the location of the UE by configuring the timing advance parameter as a function of a measured reference signal received power (RSRP) associated with a reference signal.

23. The network node of claim 19, wherein the configuration information configures the timing advance parameter as the function of the location of the UE by configuring the timing advance parameter as a function of information associated with at least one of a global navigation satellite system, a positioning reference signal, or an on-board sensor associated with the UE.

24. The network node of claim 19, wherein the configuration information configures the power control parameter as the function of time by configuring the power control parameter as a function of a slot number.

25. The network node of claim 19, wherein the configuration information configures the power control parameter as the function of time by configuring the power control parameter as a function of a time offset from a reference point.

26. The network node of claim 19, wherein the configuration information configures the power control parameter as the function of the time and the function of the location of the UE by configuring at least one parameter of a power control function as the function of the time and the function of the location of the UE.

27. The network node of claim 19, wherein the one or more processors are further configured to transmit, to the UE, reconfiguration information reconfiguring at least one of the timing advance parameter or the power control parameter.

28. The network node of claim 27, wherein the reconfiguration information deactivates a configuration of at least one of the timing advance parameter or the power control parameter as the function of the time and the function of the location of the UE.

29. A method of wireless communication performed by a user equipment (UE), comprising:

receiving configuration information configuring a timing advance parameter and a power control parameter as a function of time and a function of a location of the UE;

adjusting the timing advance parameter and the power control parameter based at least in part on the time and the location of the UE, resulting in one or more adjusted communication parameters; and communicating based at least in part on the one or more adjusted communication parameters.

30. A method of wireless communication performed by a network node, comprising:

transmitting, to a user equipment (UE), configuration information configuring a timing advance parameter and a power control parameter as a function of time and a function of a location of the UE; and communicating, with the UE, based at least in part on the timing advance parameter and the power control parameter being adjusted according to the time and the location of the UE.

* * * * *